April 28, 1925.　　　　　　　O. SHELTON　　　　　　1,535,869
RAIL JOINT FASTENER
Filed April 21, 1924　　　　2 Sheets-Sheet 1

INVENTOR.
O. Shelton,
BY
Geo. F. Kimmel
ATTORNEY.

April 28, 1925.
O. SHELTON
1,535,869
RAIL JOINT FASTENER
Filed April 21, 1924
2 Sheets-Sheet 2
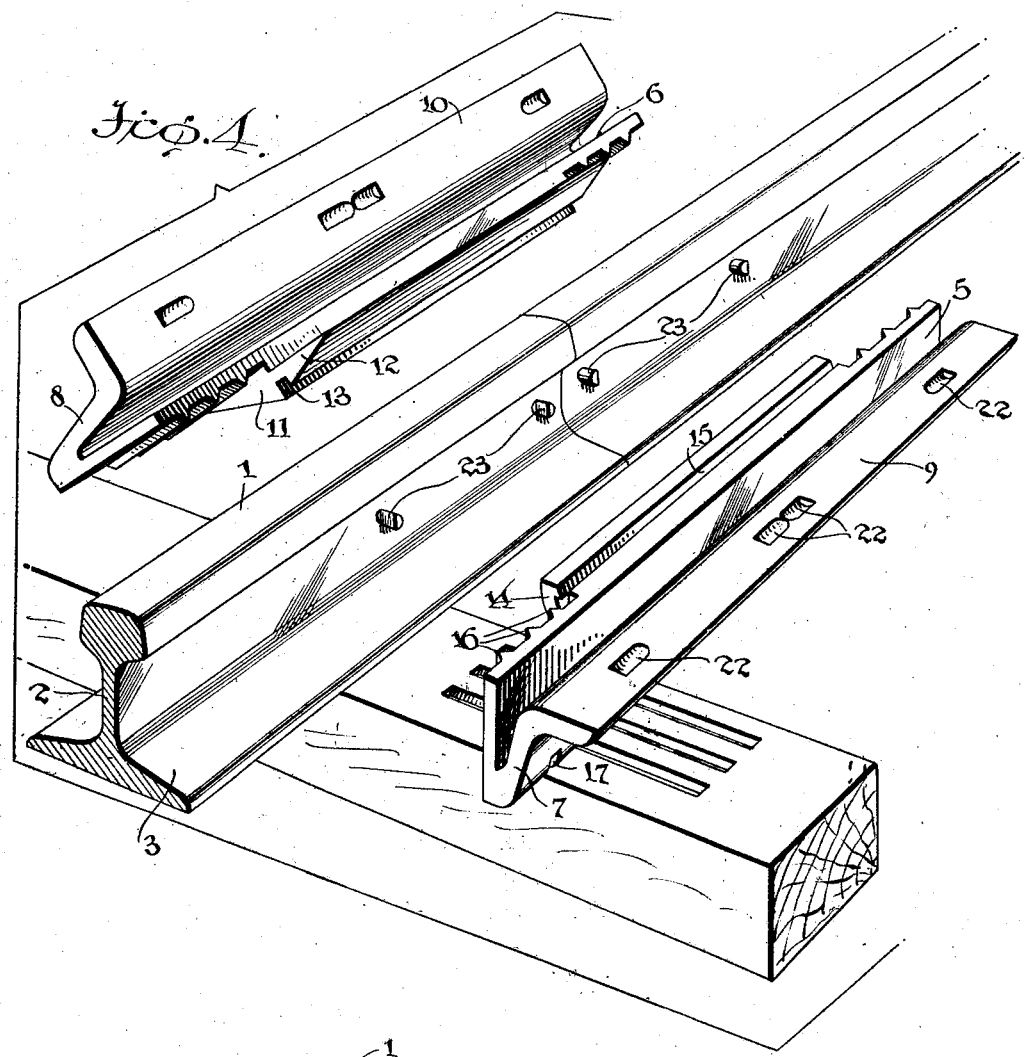
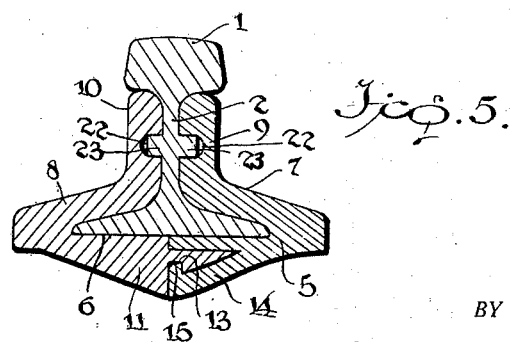
INVENTOR.
O. Shelton,
BY
Geo. P. Kimmel. ATTORNEY.

Patented Apr. 28, 1925.

1,535,869

UNITED STATES PATENT OFFICE.

OSCAR SHELTON, OF YORKTOWN, TEXAS.

RAIL-JOINT FASTENER.

Application filed April 21, 1924. Serial No. 707,987.

*To all whom it may concern:*

Be it known that I, OSCAR SHELTON, a citizen of the United States, residing at Yorktown, in the county of Dewitt and State of Texas, have invented certain new and useful Improvements in Rail-Joint Fasteners, of which the following is a specification.

This invention relates to rail joint fasteners and has for its primary object the provision, in a manner as hereinafter set forth, of an improved railroad joint fastener of a construction whereby the rails will be clamped securely and in proper alined position and held against side shifting and rattling.

Another object of the invention is the provision, in a manner as hereinafter set forth, of an improved means for fastening together the ends of railway rails without the use of fish plates, nut and bolt connections, or other fastening means.

A still further object of this invention is the provision, in a manner as hereinafter set forth, of an improved rail joint fastener having means at the under side of the rail for biting into the ties which support the fastener and rail, to prevent creeping of the rail across the ties.

A further and final object of the invention is the provision, in a manner as hereinafter set forth, of an improved rail fastening means which provides a solid secure and permanent support for the rail ends, providing a noiseless joint, easily and quickly assembled and inexpensive to manufacture and apply.

The invention will be best understood from a consideration of the following detailed description taken in connection with the accompanying drawings forming part of this specification, with the understanding that the invention is not confined to any strict conformity with the showing of the drawings but may be changed and modified so long as such changes and modifications mark no material departure from the salient features of the invention as expressed in the appended claims.

In the drawings:

Figure 4 is a detail perspective view showing a rail joint and the two members of the device embodying this invention shown as removed from the joint and in partially inverted position to show the tie engaging cleats formed upon the under side of the members.

Figure 5 is a vertical transverse view through the rail and the device embodying this invention showing another method of connecting the device with the web of the rail.

Figure 1:
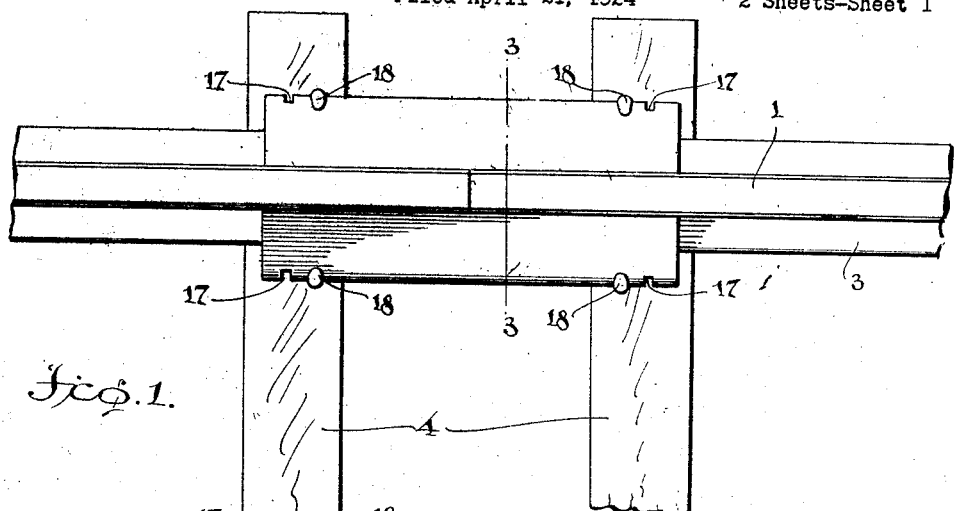
Figure 1 is a top plan view of the device embodying this invention showing a pair of rails connected and held together thereby.

Referring now to the drawings in detail wherein like numerals of reference indicate corresponding parts throughout the several views of the drawings, numeral 1 indicates the tread of a railway rail, 2 the web thereof, and 3 the base. A pair of spaced tie members 4 are shown in the usual position for supporting the railway rail.

Figure 3:
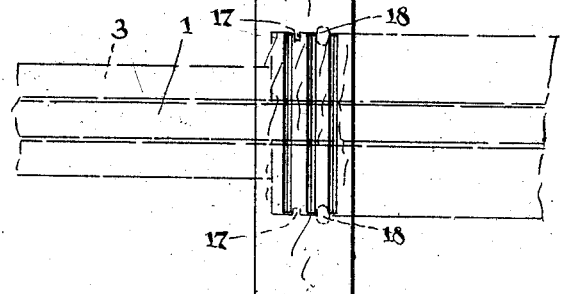
Figure 3 is a vertical transverse view taken upon the line 3—3 of Figure 1 and showing one method of engaging the clamping member with the web of the rail.
Figure 3:
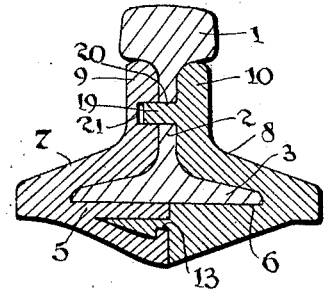
Figure 2:
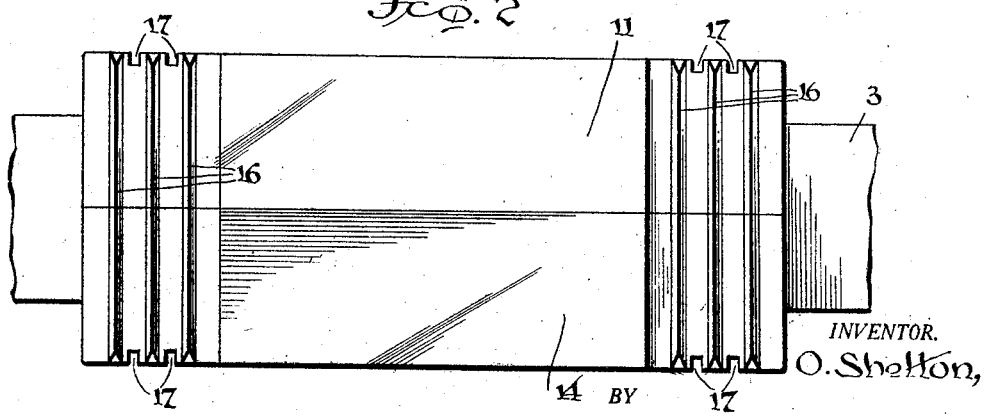
Figure 2 is a bottom plan view of the device as assembled.

The device embodying this invention comprises a pair of clamping members of substantial length, adapted to be positioned one on either side of the rail joint and these members comprise base portions 5 and 6, respectively, and intermediate portions 7 and 8 which as is clearly shown extend inwardly and upwardly at a slight inclination from the outer longitudinal edge of the base, and these portions 7 and 8 are adapted to extend over and snugly engage the upper surface of the foot of the rail, while the base engages the under side of the foot of the rail. Each of the members further includes a vertical upper portion 9 and 10, respectively, which portions 9 and 10 are continuations of their respective intermediate portions and are adapted to engage the web of the rail and abut the under side of the tread as is clearly shown in either of the Figures 3 or 5.

The base portion 6 is of gradually increased thickness from a point adjacent its outer edge to the inner edge thereof as indicated at 11. This thickened portion is not continuous throughout the length of the base as is clearly shown but terminates a substantial distance inwardly of each end. As is also shown the inner face of the thickened portion 11 is flush with the inner edge of the base 6 and this inner face of the portion 11 has extending therefrom and throughout the length thereof, the pointed head 12 which has formed along its under side a groove 13. Formed upon the under side of the base 5 and extending inwardly toward the inner edge thereof and terminating parallel therewith is a resilient tongue 14 of the same length as the thickened portion 11 upon the base 6 and also terminating inwardly of each end of the base 5 to which it is attached, and this tongue terminates in an upwardly extending flange 15 which extends throughout its length as will be seen upon reference to Figure 4 of the drawings.

Formed upon and transversely of the under side of each of the base members 5 and 6 adjacent each end of each base member is a series of ridges 16 the purpose of which will become apparent as the description of the device proceeds.

Formed in the outer edge of each base section is a plurality of notches 17 into which the securing devices 18 are placed to be driven into the ties 4, to provide a positive connection between the ties and the base of the device.

The structure thus far described is the same at all times and is descriptive of the device in general, but provision is made whereby the device may be used to connect old rails which are already provided with apertures through their webs and another structure is provided whereby new rails which have not been bored for the passage of bolts through their webs may be securely locked in position by the device, after a slight addition is made to the rail structure.

Attention will be first given to the type of device adapted for use in connection with old rails which have formed in their webs bolt holes. In this type the inner face of the vertical upper portion 10 is provided with a series of projecting pins 19 which when the device is in position extend through the bolt hole 20, in the web of the rail, and project into recesses 21 formed in the inner face of the vertical upper portion 9, as is clearly set forth in Figure 3.

In the other type, as shown in Figures 4 and 5, the vertical portions 9 and 10 are provided with a series of longitudinally extending alined recesses 22 and when the sections are together, one upon either side of the rail, these recesses receive the ends of studs 23 which project from each side of the web 2 of the rail.

In the application of this rail joint fastener, the rails are first laid across the ties in alinement and with the ends abutting as is the usual method in laying railway rails. The ties are so spaced that they will just receive therebetween the thickened portion 11 of the base 6 and the spring tongue 14 of the base 5. When the ties and rails have been so placed the two sections of the device are placed in position one on each side of the rail and across the joint and the rail ends are lifted up so that the bases 5 and 6 will slip therebeneath to be snugly engaged between the base portions 5 and 6 and the intermediate portions 7 and 8 and so that the web will be clamped between the vertical portions 9 and 10. When the portions have been forced inwardly toward one another, the pointed head 12 carried from the base 6 will force itself between the resilient flange 15 and the base 5 and will slip in position between the lip 14 and the base so that the flange 15 will engage in the groove 13 and thus securely lock the sections together one on either side of the rail. The transverse ridges 16 carried upon each end of each portion of the device will be forced downwardly into the top of the ties by the weight of the rails and by the weight of trains passing thereover after the sections have been locked in position. This prevents the creeping of the rails and the rail fasteners across the ties. Spikes 18 are then driven into the ties through the notches 17 formed in the edge of the base and after this the device is completely assembled and will not move from position, and the more weight which is applied or passed over the rails the tighter will become the joint.

Having thus described my invention what I claim is:

1. In a rail joint fastener, the combination with a pair of rails, of a pair of clamping members of substantial length positioned one on each side of said rails and each comprising a base, an inclined intermediate portion and a vertical upper portion, the longitudinal inner edge faces of said bases being vertical and abutting throughout beneath the rail clamped therebetween, a notched head formed longitudinally of the face of one of said bases and terminating inwardly of each end thereof, a resilient tongue formed longitudinally of the under side of the other base and terminating inwardly of each end and further adapted to receive and hold the notched head against the under side of the adjacent base, to retain said clamping members in position, and means for effecting a locking engagement between said upper portions and said rail.

2. In a rail joint fastener, the combination with a pair of rails, of a pair of clamping members of substantial length positioned one on each side of said rails and each comprising a base, an inclined intermediate portion and a vertical upper portion, the longitudinal inner edge faces of said bases being vertical and abutting throughout beneath the rail clamped therebetween, each base having a longitudinally extending thickened portion upon its under side terminating inwardly of each end and adapted to depend between and space a pair of ties, the thickened portion of one base being cut out along its inner face to set up a resilient tongue upon the under side of the base, a notched head extending throughout the length of and upon the face of the other thickened portion and adapted to be engaged between said tongue and adjacent base to retain the clamping members in position, and means for effecting a locking engagement between said upper portions and said rail.

In testimony whereof, I affix my signature hereto.

OSCAR SHELTON.